(12) United States Patent
Menchetti (10) Patent No.: US 11,729,535 B2
(45) Date of Patent: Aug. 15, 2023

(54) OPTICAL SWITCH AND OPTICAL ROUTING METHOD AND SYSTEM

(71) Applicant: BRITISH TELECOMMUNICATIONS PUBLIC LIMITED COMPANY, London (GB)

(72) Inventor: Marco Menchetti, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/995,219

(22) PCT Filed: Mar. 10, 2021

(86) PCT No.: PCT/EP2021/056069
§ 371 (c)(1),
(2) Date: Sep. 30, 2022

(87) PCT Pub. No.: WO2021/197779
PCT Pub. Date: Oct. 7, 2021

(65) Prior Publication Data
US 2023/0124153 A1    Apr. 20, 2023

(30) Foreign Application Priority Data

Mar. 30, 2020   (EP) .................................. 20166643
Mar. 30, 2020   (GB) .................................. 2004580

(51) Int. Cl.
*H04Q 3/52*     (2006.01)
*H04Q 11/00*    (2006.01)
*G02B 26/08*    (2006.01)

(52) U.S. Cl.
CPC ......... *H04Q 3/526* (2013.01); *G02B 26/0866* (2013.01); *H04Q 11/0005* (2013.01);
(Continued)

(58) Field of Classification Search
CPC ............... H04Q 3/526; H04Q 11/0005; H04Q 2011/0015; H04Q 2011/0026;
(Continued)

(56) References Cited

U.S. PATENT DOCUMENTS 3,734,592 A    5/1973   Sztankay et al.
5,491,579 A    2/1996   Justus et al.
(Continued)

FOREIGN PATENT DOCUMENTS

EP    0902311 A2    3/1999
EP    1467239 A2    10/2004
(Continued)

OTHER PUBLICATIONS

Casaleiro J., et al., "On the Feasibility of GPON Fiber Light Energy Harvesting for the Internet of Things," ISEL Academic Journal of Electronics, Telecommunications and Computers IoT-2018 Issue, vol. 4, n. 1 (2018) ID-9, 11 pages.
(Continued)

*Primary Examiner* — Leslie C Pascal
(74) *Attorney, Agent, or Firm* — Patterson Thuente, P.A.

(57) ABSTRACT

An optical switch is proposed, for routing an optical transmission signal according to an optical control signal, including one or more optical control ports; three or more optical transmission ports; a light director; and a thermally driven light mill; where the light mill and the light director are arranged with respect to each other, to the one or more control ports and to the three or more transmission ports such that: illumination of a respective one of the one or more control ports by a control beam carrying the control signal drives the light mill to rotate towards a respective position in which the light director is arranged so as to direct a transmission beam carrying the transmission signal, entering the switch via a respective one of the transmission ports, to
(Continued)

exit the switch via a respective other of the transmission ports.

19 Claims, 8 Drawing Sheets

(52) U.S. Cl.
CPC ............... *H04Q 2011/0015* (2013.01); *H04Q 2011/0026* (2013.01); *H04Q 2011/0041* (2013.01); *H04Q 2201/804* (2013.01)

(58) Field of Classification Search
CPC ..... H04Q 2011/0041; H04Q 2201/804; G02B 26/0866
See application file for complete search history.

(56) References Cited

U.S. PATENT DOCUMENTS

| | | | |
|---|---|---|---|
| 5,796,523 | A | 8/1998 | Hall |
| 6,218,658 | B1 | 4/2001 | Taneda et al. |
| 6,256,430 | B1 | 7/2001 | Jin et al. |
| 6,404,727 | B1 | 6/2002 | Rao |
| 6,415,075 | B1 | 7/2002 | DeRosa et al. |
| 6,549,692 | B1 | 4/2003 | Harel et al. |
| 6,711,319 | B2 | 3/2004 | Hoen |
| 6,760,506 | B2 | 7/2004 | Laor |
| 6,787,745 | B2 | 9/2004 | Hajjar et al. |
| 6,795,603 | B2 | 9/2004 | Utsunomiya |
| 6,829,079 | B2 | 12/2004 | Oda et al. |
| 6,965,710 | B2 | 11/2005 | Makio |
| 9,354,483 | B2 | 5/2016 | Izumi |
| 2009/0207478 | A1 | 8/2009 | Oron et al. |
| 2010/0166368 | A1 | 7/2010 | Oron et al. |
| 2011/0305413 | A1 | 12/2011 | Heidrich et al. |

FOREIGN PATENT DOCUMENTS

| | | |
|---|---|---|
| EP | 1724624 A1 | 11/2006 |
| EP | 2684084 A1 | 1/2014 |
| WO | WO-9944841 A1 | 9/1999 |
| WO | WO-2009156816 A1 | 12/2009 |
| WO | WO-2019133101 A2 | 7/2019 |

OTHER PUBLICATIONS

Combined Search and Examination Report under Sections 17 and 18(3) for Great Britain Application No. 2004580.3, dated Sep. 21, 2020, 5 pages.
Combined Search and Examination Report under Sections 17 and 18(3) for Great Britain Application No. 2004584.5, dated Sep. 21, 2020, 5 pages.
Examination Report under section 18(3) for GB Application No. GB2004580.3, dated Jan. 19, 2022, 3 pages.
Examination Report under section 18(3) for GB Application No. GB2004580.3, dated Mar. 23, 2022, 3 pages.
Examination Report under section 18(3) for GB Application No. GB2004584.5, dated Jan. 19, 2022, 4 pages.
Extended European Search Report for Application No. 20166643.5 dated Sep. 28, 2020, 6 pages.
Extended European Search Report for Application No. 20166647.6 dated Aug. 26, 2020, 7 pages.
Gauthier R.C., et al., "Activation of Microcomponents With Light for Micro-Electro-Mechanical Systems and Micro-Optical-Electro-Mechanical Systems Applications," Applied Optics, Apr. 20, 2002, pp. 2361-2367.
Han L., et al., Light-Powered Micromotor: Design, Fabrication, and Mathematical Modeling, Journal of Microelectromechanical Systems, vol. 20, No. 2, Apr. 2011, pp. 487-496.
International Search Report and Written Opinion for Application No. PCT/EP2021/056069, dated May 27, 2021, 11 pages.
International Search Report and Written Opinion for Application No. PCT/EP2021/056074, dated Apr. 14, 2021, 12 pages.
Lin L.Y., et al., "Free-Space Micromachined Optical Switches With Submillisecond Switching Time for Large-Scale Optical Cross Connects," IEEE Photonics Technology Letters, vol. 10, No. 4, Apr. 1998, pp. 525-527.
Makri E., et al., "Concept of a Reflective Power Limiter Based on Nonlinear Localized Modes," Feb. 2014, Physical Review A, Atomic, molecular, and optical physics, vol. 89(3), 6 pages.
Shakeel M.N., et al., "Optical Switches," 17 pages.
Toshiyoshi H., et al., "Electrostatic Micro Torsion Mirrors for an Optical Switch Matrix," Journal of Microelectromechanical Systems, vol. 5, No. 4, Dec. 1996, pp. 231-237.
Wolfe D., et al., "A Horizontal Vane Radiometer: Experiment, Theory, and Simulation," 26 pages.

OPTICAL SWITCH AND OPTICAL ROUTING METHOD AND SYSTEM

PRIORITY CLAIM

The present application is a National Phase entry of PCT Application No. PCT/EP2021/056069, filed Mar. 10, 2021, which claims priority from EP Patent Application No. 20166643.5, filed Mar. 30, 2020 and GB Patent Application No. 2004580.3, filed Mar. 30, 2020 each of which is hereby fully incorporated herein by reference.

TECHNICAL FIELD

The present disclosure relates to routing of optical signals. More specifically, aspects relate to an optical switch, a method of routing an optical transmission signal and an optical routing system.

BACKGROUND

Optical networks are used to communicate data, encoded in optical signals, over fiber optic cables. To ensure optical signals are successfully transmitted from a source to a destination it can be necessary to route them via junctions between optical fibers. Various kinds of optical switches have been developed for use at such junctions. These include microelectromechanical systems (MEMS) switches incorporating electrically driven mechanical actuators, liquid crystal switches incorporating components whose transparency can be changed by application of an electrical signal and acoustic optical modulators which use piezoelectric transducers to change the direction of optical beams. However, all of these switches require electrical power, which is not readily available in passive optical networks.

What is needed is an alternative means of routing optical signals.

SUMMARY

According to a first aspect, there is provided an optical switch for routing an optical transmission signal according to an optical control signal, the switch comprising: one or more optical control ports; three or more optical transmission ports; a light director; and a thermally driven light mill; wherein the light mill and the light director are arranged with respect to each other, to the one or more control ports and to the three or more transmission ports such that: illumination of a respective one of the one or more control ports by a control beam carrying the control signal drives the light mill to rotate towards a respective position in which the light director is arranged so as to direct a transmission beam carrying the transmission signal, entering the switch via a respective one of the transmission ports, to exit the switch via a respective other of the transmission ports.

The light mill comprises: an axle; and at least one vane: arranged to rotate about the axle's axis in an environment comprising fluid, and having a first side and a second side which are thermally insulated from one another such that the light mill is driven by illumination of the first side by the control beam so that the first side absorbs more light energy than the second side, establishing a temperature gradient from the second side to the first side so that the vane rotates about the axle's axis with the first side trailing. The control beam can originate from a laser.

A side of a vane of the light mill arranged to be illuminated by the control beam can have a higher optical absorptance than an opposing side of that vane. Alternatively or additionally, a side of a vane of the light mill arranged to be illuminated by the control beam and an opposing side of that vane can be shaped such that, over a range of rotation of the light mill from an initial position in which it resides immediately preceding illumination of the respective one of the one or more control ports by the control signal, to the respective position, the side of the vane illuminated by the control beam receives a greater quantity of radiant energy from the control beam than the opposing side.

The transmission ports can comprise a single optical input port and a plurality of optical output ports, the light mill and the light director being arranged with respect to each other, to the one or more control ports and to the three or more transmission ports such that, for each of the output ports: illumination of a respective one of the one or more control ports by the control beam drives the light mill to rotate towards a respective position in which the light director is arranged so as to direct the transmission beam, entering the switch via the input port, to exit the switch via that output port.

The transmission ports can comprise a plurality of optical input ports and a single optical output port, the light mill and the light director being arranged with respect to each other, to the one or more control ports and to the three or more transmission ports such that, for each of the input ports: illumination of a respective one of the one or more control ports by the control beam drives the light mill to rotate towards a respective position in which the light director is arranged so as to direct the transmission beam, entering the switch via that input port, to exit the switch via the output port.

The optical switch can be configured such that, for each of the input ports: the control beam and the transmission beam are derived from a common source beam. For each of the input ports: the one of the one or more control ports illuminated by the control signal can be that input port, the source beam itself serving as both the transmission beam and the control beam.

The optical switch can further comprise, for each of the input ports, an optical splitter arranged to split the source beam into the transmission beam and the control beam. In some examples there is only one control port, the optical switch further comprising a control signal source configured to illuminate the control port according to a computer-implemented scheduling method.

The light director can be arranged to rotate with the light mill. The optical switch can further comprise one or more stays, each arranged to prevent rotation of the light mill beyond at least one of the respective positions.

Optionally, the light mill comprises an axle; and one of the one or more stays is comprised in a structure configured to support one of the axle's two ends. The light director can comprise a mirror.

A surface of the light mill on which the control signal is incident can be partially reflective, thereby providing the mirror. The mirror can be arranged to reflect light incident substantially on the light mill's axis of rotation such that light is incident on the output port along substantially the same line regardless of the one of the input ports it originated from. The optical switch can further comprise a biasing element, the light mill being coupled to the biasing element such that: the light mill is biased towards an equilibrium position different from any of the respective positions; or the light mill is biased towards one of the respective positions. The optical switch can further comprise a housing which encloses the light mill, the housing comprising an aperture configured for partial evacuation of fluid surrounding the light mill.

According to a second aspect, there is provided a method of routing an optical transmission signal, the method comprising illuminating one of the optical transmission ports of the optical switch of any preceding claim with the optical transmission signal. The method can further comprise: illuminating the control port for one of d predetermined durations, each of said predetermined durations corresponding to a rotation of the light mill from a first one of the respective positions to a respective one of the other such respective positions, wherein d is equal to p−1, p being the number of transmission ports. According to a third aspect, there is provided an optical routing system comprising: the optical switch of the first aspect; and a computing device arranged to implement the computer-implemented scheduling method.

BRIEF DESCRIPTION OF THE FIGURES

Aspects of the present disclosure will now be described by way of example with reference to the accompanying figures. In the figures:

FIG. 3B1 illustrates the switch of FIG. 3A in a first "on" position.

FIG. 3B2 illustrates the switch of FIG. 3A in a second "on" position.

FIG. 4B1 illustrates the switch of FIG. 4A in a first "on" position.

FIG. 4B2 illustrates the switch of FIG. 4A in a second "on" position.

FIG. 5B1 illustrates the switch of FIG. 5A in a first "on" position.

FIG. 5B2 illustrates the switch of FIG. 5A in a second "on" position.

FIG. 6B1 illustrates the switch of FIG. 6A in a first "on" position.

FIG. 6B2 illustrates the switch of FIG. 6A in a second "on" position.

FIG. 8B1 illustrates the switch of FIG. 8A in a first "on" position.

FIG. 8B2 illustrates the switch of FIG. 8A in a second "on" position.

FIG. 8B3 illustrates the switch of FIG. 8A in a third "on" position.

FIG. 9B1 illustrates the switch of FIG. 9A in a first "on" position.

FIG. 9B2 illustrates the switch of FIG. 9A in a second "on" position.

DETAILED DESCRIPTION OF THE FIGURES

The following description is presented to enable any person skilled in the art to make and use the system and is provided in the context of a particular application. Various modifications to the disclosed embodiments will be readily apparent to those skilled in the art.

The terms "top", "bottom", "side", "front", "back", "forward", "rear", "clockwise", "anticlockwise" and other terms describing the orientation of features are not intended to be limiting and, where used, are purely included in order to facilitate the description of the relative location of these features in the context of the accompanying drawings. In use, or during storage, the features may be disposed in other orientations.

It is proposed to use the light mill effect to route an optical signal between an input and an output of an optical switch. A light director such as a mirror is coupled to a thermally driven light mill so that motion of the light mill causes the light director to adjust the route of the optical signal.

A thermally driven light mill comprises at least one vane/blade whose two sides are thermally insulated from one another so that when one side is heated by light or other electromagnetic radiation it remains hotter than the other side. The vanes are located in fluid (typically low-pressure air) such that convection currents set up in the fluid by the asymmetry in temperature between the two sides of each vane are sufficient to cause the light mill to rotate.

In order to start a stationary light mill rotating the light mill effect (and therefore the radiant flux of the light source causing it) must be sufficient to overcome the light mill's inertia. In order to keep the light mill rotating, the light mill effect (and therefore the radiant flux of the light source causing it) must be sufficient to overcome frictional forces acting on the light mill during rotation, with respect to its mounting(s) and the surrounding fluid.

Optionally, the two sides of each vane can have different electromagnetic absorption characteristics so as to increase the rate at which the temperature differential is established and/or allow the temperature differential to become established in circumstances where both sides of the vane are exposed to the radiation.

Figure 1A:
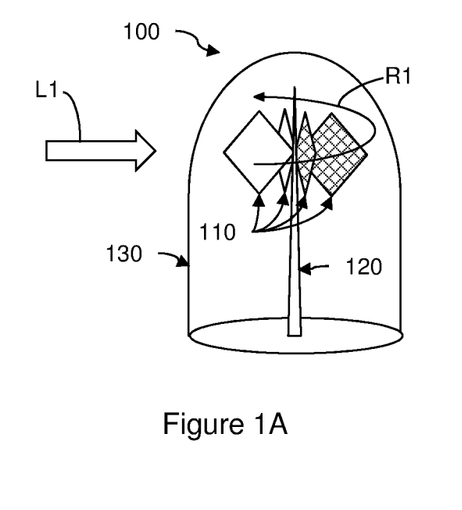
FIG. 1A illustrates a Crookes radiometer light mill.

FIG. 1A illustrates a Crookes radiometer 100, the classical demonstration of the light mill effect. The Crookes radiometer 100 comprises four vanes 110 arranged to rotate around an axle 120 within a partially evacuated jar 130. Each vane 110 is painted white on one side and black on the other, with the vanes arranged so that black and white sides alternate around the radiometer. (The black sides are indicated by cross-hatching.) When light is shone on the radiometer 100 from the direction indicated by the arrow L1, the vanes rotate about the axle 120 in the direction indicated by the arrow R1, i.e. with the black sides trailing.

Figure 1B:
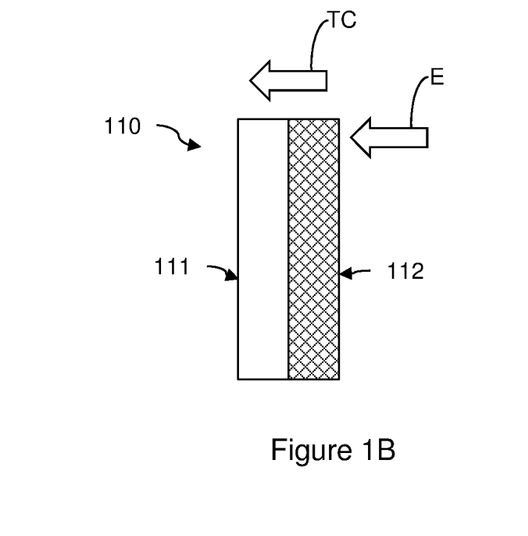
FIG. 1B illustrates forces on each vane of the Crookes radiometer of FIG. 1A.

FIG. 1B illustrates forces on each vane 110 of the Crookes radiometer 100 of FIG. 1A. In FIG. 1B a vane 110 is shown side-on, with its white side 111 to the left and its black side 112 to the right. The white side 111 and the black side 112 are thermally insulated from one another. The black side 112 absorbs more light energy than the white side 111. A temperature gradient is therefore established from the white side 111 to the black side 112 (left to right in FIG. 1B). This sets up convection currents in the thin air surrounding the vane, resulting in unbalanced forces on the vane. A "thermal creep" force TC acts in a direction opposite to the temperature gradient. An additional "Einstein effect" force E acts on the edges of the surfaces which lie perpendicular to the temperature gradient, again in a direction opposite to the temperature gradient. The forces TC and E therefore cause the vane 110 to rotate about the axle 120 with the black side 112 trailing.

Hettner radiometers are similar to Crookes radiometers but with horizontal (as opposed to vertical) vanes, the exposed face of each vane being painted half black and half white, the black and white sides alternating around the radiometer. The Einstein effect is not present in a Hettner radiometer, but it still rotates with the black sides of the vanes trailing due to the thermal creep force.

Figure 2:
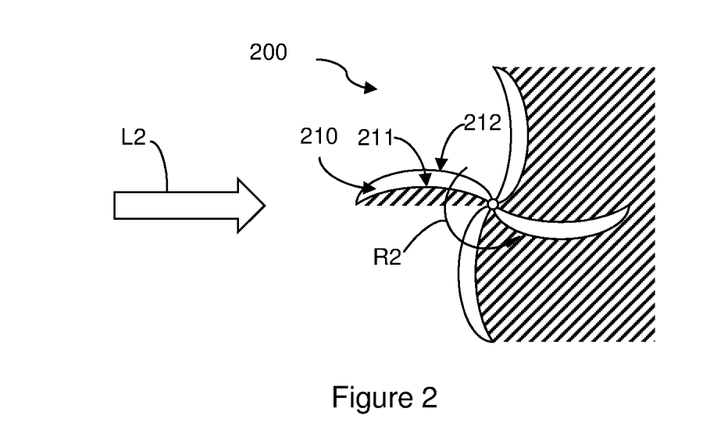
FIG. 2 illustrates another design of light mill.

FIG. 2 is a plan view illustrating another design of light mill 200 where a difference in light absorption between the two sides of each vane 210 results from their geometry, not their color. The vanes 210 are shaped so that they each have a concave side 211 and a convex side 212, the convex and concave faces alternating around the radiometer. The shading in FIG. 2 illustrates where shadow falls when light is shone on the light mill 200 from the direction indicated by the arrow L2. It can be seen that, over the course of a full rotation, the convex sides 212 of the vanes 210 receive more light energy than the concave sides 211. This establishes a temperature gradient from the concave side 211 to the convex side 212 of each vane 210, so that the thermal creep force and the Einstein effect cause the vanes 210 to rotate about the axle in the direction indicated by the arrow R2, i.e. with the convex sides 212 trailing. The example light mill designs described above all incorporate vanes in which there is asymmetry between the light absorption characteristics of two sides of the vane. However, motion will result from the thermal creep force and (depending on the geometry of the design) the Einstein effect even without this asymmetry, provided a temperature gradient can be established between two sides of a vane so that it is thermally driven.

Thermally driven light mills typically operate in low pressure gases or gas mixtures (such as air) but can generally function in any fluid capable of carrying convection currents.

While the example light mill designs described above each comprise four vanes, any number of vanes can be subject to the light mill effect. It will also be appreciated that light mills can be driven by other forms of electromagnetic radiation than visible light, for example infrared or ultraviolet radiation could also be used.

Several example designs of optical switches for routing an optical transmission signal according to an optical control signal will now be described. Each example switch comprises one or more optical control ports, three or more optical transmission ports, a light director and a thermally driven light mill. The light mill and the light director are arranged with respect to each other, to the one or more control ports and to the three or more transmission ports such that illumination of a respective one of the one or more control ports by a control beam carrying the control signal drives the light mill to rotate towards a respective position in which the light director is arranged so as to direct the transmission signal, entering the switch via a respective one of the transmission ports (an input port), to exit the switch via a respective other of the transmission ports (an output port).

In FIGS. 3A to 9D described below, to avoid cluttering the figures, reference numerals are shown only on the figure or figures which best illustrate how the relevant components are arranged and used.

Figure 3A:
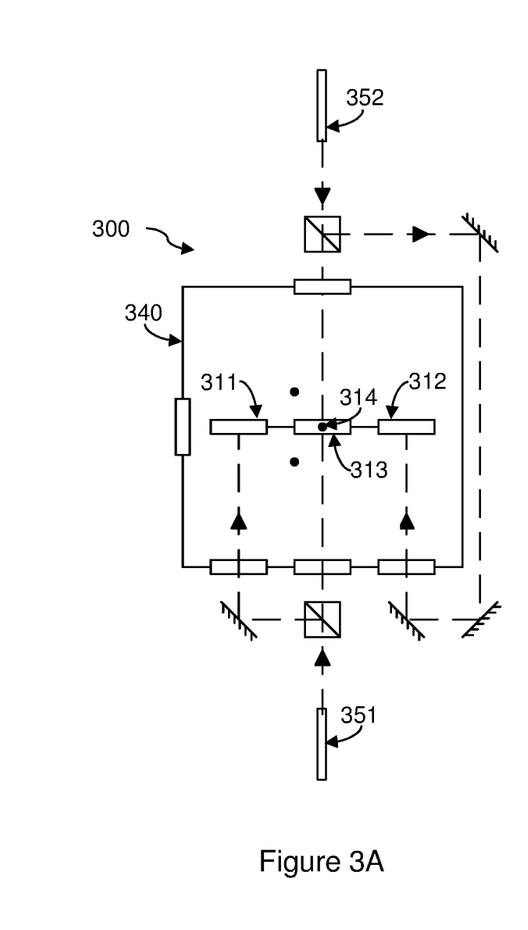
FIG. 3A illustrates an example optical switch in an "off" position.
Figure 3B:
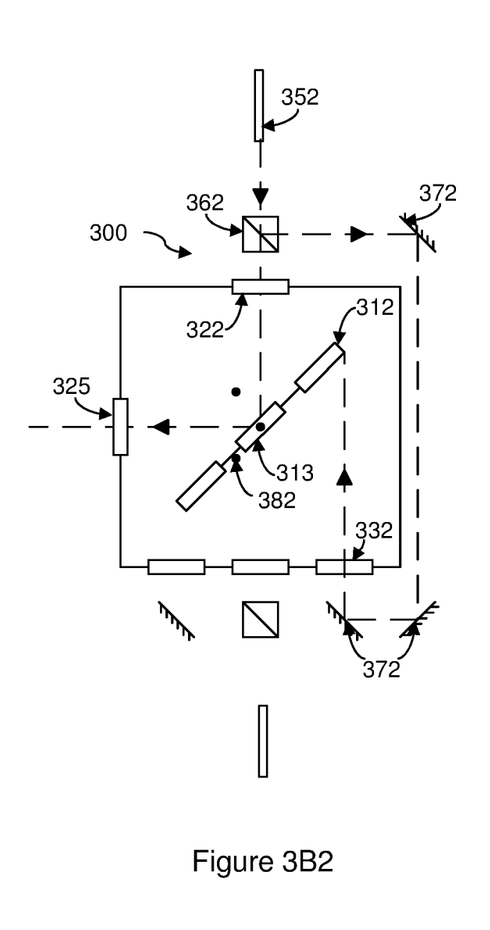
Figure 3B:
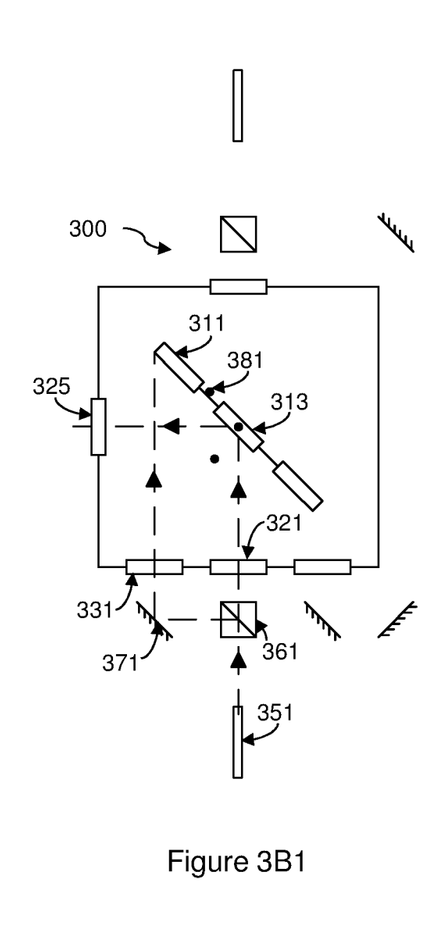

FIG. 3A illustrates a schematic plan view of an example optical switch 300 comprising a light mill in an "off" position. FIGS. 3B1 and 3B2 illustrate schematic plan views of the switch 300 in each of its two possible "on" positions. The light mill of the switch 300 comprises a rigid assembly configured to rotate about an axle 314 on which it is centered. The rigid assembly comprises a central light director 313 rigidly connected intermediate a first vane 311 and a second vane 312 which are mirror images of one another in the axle 314's axis. The light mill is located in a sealed housing 340 which keeps the air around the light mill at low pressure, but not entirely evacuated.

Optical beams (such as laser beams) carrying optical transmission signals can be input to the switch 300 either from a first optical fiber 351 or a second optical fiber 352 as shown by the dashed lines in FIG. 3A. The optical fiber 351 and 352 are coupled to the switch 300 from opposite sides.

As shown in FIGS. 3A and 3B1, a first source beam input by the first optical fiber 351 is incident on a first splitter 361. This splits the first source beam into a first transmission beam and a first control beam. The first transmission beam continues on through a first input port 321, on the same side of the switch 300 as the first optical fiber 351, to be incident centrally on the light director 313. (The onwards path of the first transmission beam from that point will be described below in relation to FIG. 3B1.) The first control beam is routed via a first mirror 371, through a first optical control port 331, on the same side of the switch 300 as the first optical fiber 351, to be incident on the first vane 311.

As shown in FIGS. 3A and 3B2, a second source beam input by the second optical fiber 352 is incident on a second splitter 362. This splits the second source beam into a second transmission beam and a second control beam. The second transmission beam continues on through a second input port 322, on the same side of the switch 300 as the second optical fiber 352, to be incident centrally on the light director 313. The second transmission beam is incident on the opposite side of the light director 313 to the first transmission beam. (The onwards path of the second transmission beam from that point will be described below in relation to FIG. 3B2.) The second control beam is routed around the housing 340 via three further mirrors 372, through a second optical control port 332, on the same side of the switch 300 as the first optical fiber 351, to be incident on the second vane 312.

The surfaces of the first and second vanes 311 and 312 struck by the first and second control beams respectively are configured to absorb at least some of the electromagnetic radiation carried by those respective beams. These surfaces are thermally insulated from the surfaces on the opposite side of each vane so that a temperature gradient arises from the shaded side to the illuminated side. The light mill effect thus causes the light mill to rotate so that the illuminated vane retreats from the control beam incident on it. Rotation of the light mill is halted by first and second stays 381 and 382 so that the light mill is positioned as respectively shown in FIGS. 3B1 and 3B2, respectively 45° clockwise and anticlockwise of its off position as shown in FIG. 3A.

The first stay 381 is a post which prevents clockwise motion of the light mill beyond the position shown in FIG. 3B1 so that the reflected portion of the beam cannot be misdirected partly or fully onto the portion of the housing 340 between the output port 325 and the input port 322, for example in response to external vibrations. It can for example be formed of a material capable of buffering impact forces to reduce wear on both the first stay 381 and the portion of the light mill which comes into contact with it.

The second stay 382 is similarly a post which prevents anticlockwise motion of the light mill beyond the position shown in FIG. 3B2 so that the reflected portion of the beam cannot be misdirected partly or fully onto the portion of the housing 340 between the output port 325 and the input port 321, for example in response to external vibrations. Similarly to the first stay 381, the second stay 382 can for example be formed of a material capable of buffering impact forces to reduce wear on both the second stay 382 and the portion of the light mill which comes into contact with it.

The surfaces of the light director 313 on which first and second transmission beams are incident are both at least partially reflective. The first and second transmission beams are therefore both directed to an output port 325, which is perpendicular to both of the input ports 321 and 322, by the light director 313 as respectively shown in FIGS. 3B1 and 3B2.

In this way, when an optical transmission signal is input to the switch 300 via one of the first and second optical fiber 351 and 352 the switch automatically switches that transmission signal to the output port 325 for onwards transmission.

Contention between transmission signals from the first and second optical fibers 351 and 352 can be avoided by network scheduling. Alternatively, the switch 300 can be used to select the stronger of two such transmission signals for onwards transmission, since the light mill will rotate under the control of the more powerful beam.

Figure 4A:
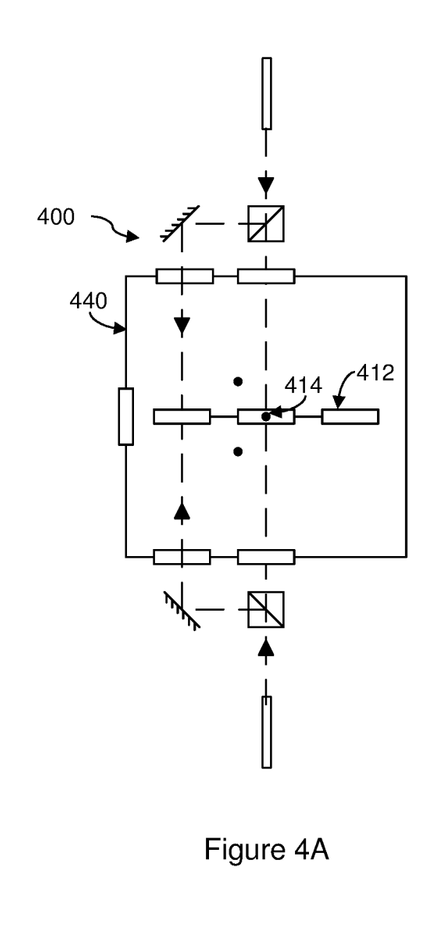
FIG. 4A illustrates another example optical switch in an "off" position.
Figure 4B:
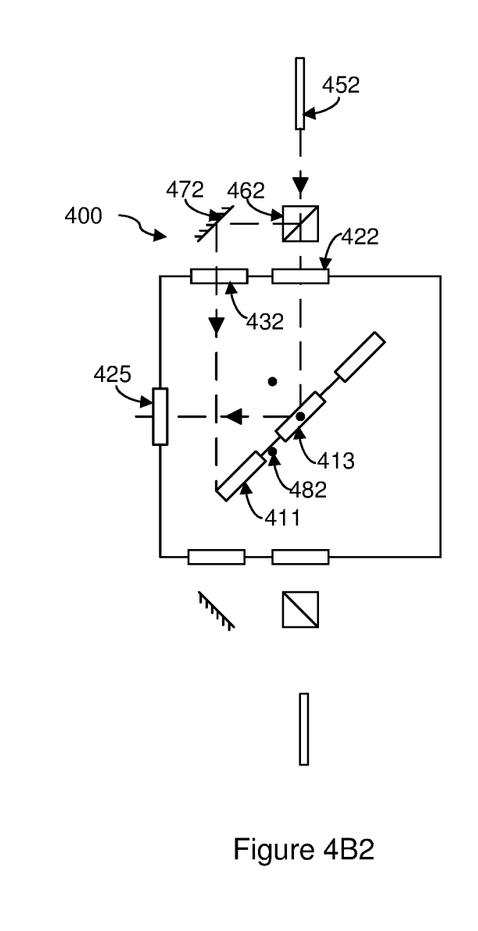
Figure 4B:
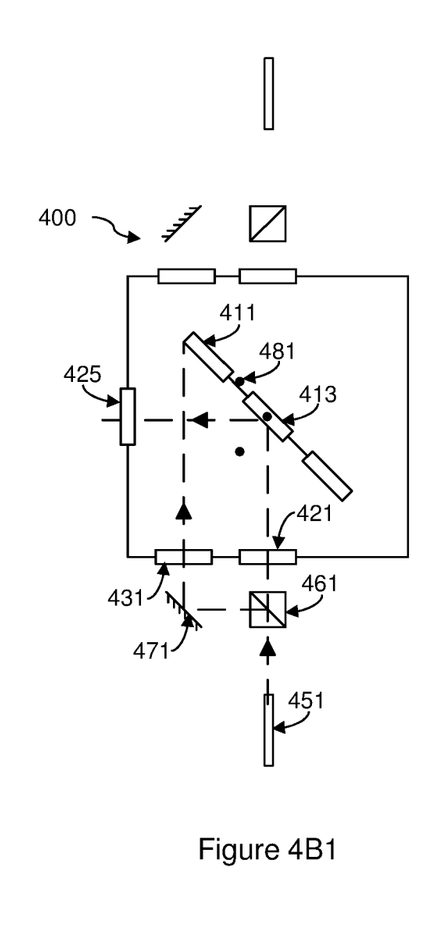

FIG. 4A illustrates a schematic plan view of another example optical switch 400 comprising a light mill in an "off" position. FIGS. 4B1 and 4B2 illustrate schematic plan views of the switch 400 in each of its two possible "on" positions.

The switch 400 is similar to the switch 300 of FIGS. 3A, 3B1 and 3B2 in many respects. The switch 400 can receive inputs from first and second optical fibres 451 and 452, respectively coupled to first and second splitters 461 and 462. It comprises a housing 440 having first and second input ports 421 and 422 and an output port 425. All of these components are arranged as described above for the corresponding components of the switch 300 of FIGS. 3A, 3B1 and 3B2.

However, unlike in the switch 300 of FIGS. 3A, 3B1 and 3B2, with the light mill in the off position as shown in FIG. 4A, the switch 400 has mirror symmetry in a plane through the center of its output port 425 and its light mill axel 414. Only a first vane 411 of the light mill needs to be configured to absorb control beams but, unlike the first vane 311 of the switch 300 of FIGS. 3A, 3B1 and 3B2, it must be configured to be capable of absorbing a control beam on both sides since the switch 400 comprises first and second control ports 431 and 432 respectively on the same sides of the switch 400 as the first and second optical fibers 451 and 452. A second vane 412 can optionally be provided as shown in FIG. 4A, to act as a counterweight to the first vane 411, but it does not need to be configured to absorb light. A centrally located light director 413 of the light mill is configured to be reflective on both sides, similarly to the light director 313 of the switch 300 of FIGS. 3A, 3B1 and 3B2.

As shown in FIGS. 4A and 4B1, the paths of a first source beam from the first optical fiber 451 and first transmission and control beams originating from that first source beam are identical to the paths of the corresponding first source, transmission and control beams as shown in FIGS. 3A and 3B1.

As shown in FIGS. 4A and 4B2, the paths of a second source beam from the second optical fiber 452 and second transmission and control beams originating from that second source beam are mirror images (in a plane through the center of the output port 425 and the light mill axel 414) of the paths of the corresponding first source, transmission and control beams as shown in FIGS. 4A and 4B1.

Figure 5A:
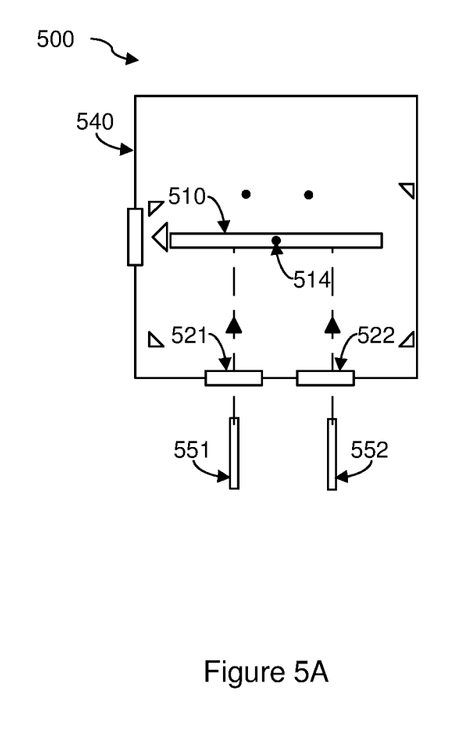
FIG. 5A illustrates another example optical switch in an "off" position.
Figure 5B:
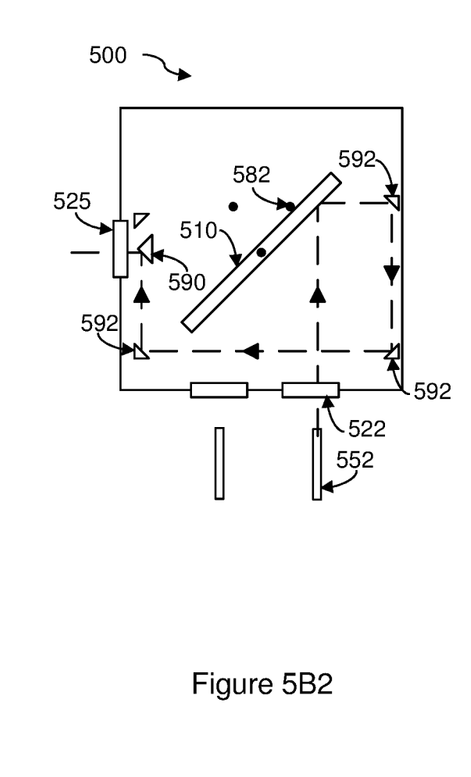
Figure 5B:
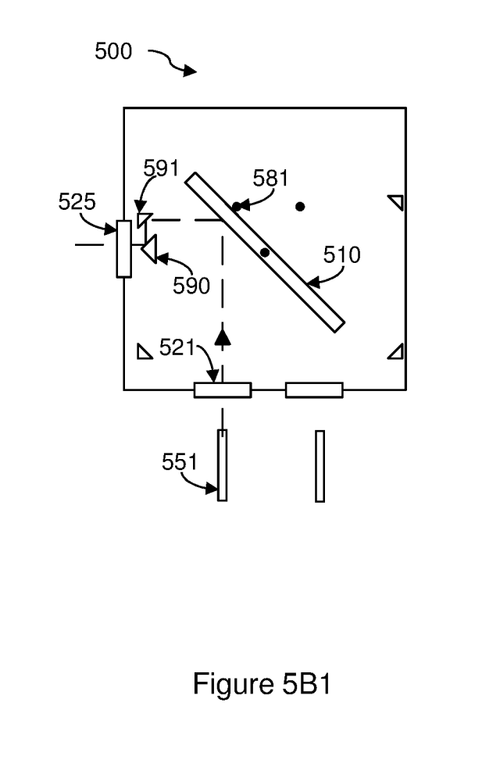

FIG. 5A illustrates a schematic plan view of another example optical switch 500 comprising a light mill in an "off" position. FIGS. 5B1 and 5B2 illustrate schematic plan views of the switch 500 in each of its two possible "on" positions.

The light mill comprises a rigid vane 510 configured to rotate about an axel 514 on which it is centered. The light mill is located in a sealed housing 540 which keeps the air around the light mill at low pressure, but not entirely evacuated.

Optical beams (such as laser beams) carrying optical transmission signals can be input to the switch 500 either from a first optical fiber 551 or a second optical fiber 552 as shown by the dashed lines in FIG. 5A. The optical fibers 551 and 552 are coupled to the switch 500 from the same side.

As shown in FIGS. 5A and 5B1, a first beam input by the first optical fiber 551 passes through a first input port 521, on the same side of the switch 500 as the first optical fiber 551, to be incident on the vane 510 to the left of the axle 514. (The onwards path of the first beam from that point will be described below in relation to FIG. 5B1.) As shown in FIGS. 5A and 5B2, a second beam input by the second optical fiber 552 passes through a second input port 522, on the same side of the switch 500 as the second optical fiber 552, to be incident on the vane 510 to the right of the axle 514. (The onwards path of the second beam from that point will be described below in relation to FIG. 5B2.)

The surface of the vane 510 struck by the first and second beams is configured, at least in the illuminated regions, to partially absorb and partially reflect the electromagnetic radiation carried by those respective beams. This surface is thermally insulated from the surface on the opposite side of the vane 510 so that a temperature gradient arises from the shaded surface to the illuminated surface on the respective side of the axle 514 being illuminated. (The axle 514 and/or a central region of the vane 510 intermediate the regions illuminated by the first and second beams can optionally provide thermal insulation to reduce or prevent conduction of heat along the length of the vane 510 from one side of the axle 514 to the other.) The light mill effect thus causes the light mill to rotate so that the illuminated half of the vane retreats from the beam incident on it. Rotation of the light mill is halted by respective first and second stays 581, 582 so that the light mill is positioned as respectively shown in FIGS. 5B1 and 5B2, respectively 45° clockwise and anti-clockwise of its off position as shown in FIG. 5A.

As shown in FIG. 5B1, the portion of the first beam reflected by the vane 510 is reflected by a first light router 591, via a dual light router 590, to an output port 525. Similarly, as shown in FIG. 5B2, the portion of the second beam reflected by the vane 510 is reflected around the vane 510 by three further light routers 592, via the dual light router 590, to the output port 525. The first light router 591 and further light routers 592 can for example be mirrors, or prisms configured to act as mirrors. The dual light router 590 can for example be a prism, or two mirrors arrange at a right angle to one another.

In this way, when an optical transmission signal is input to the switch 500 via one of the first and second optical fibers 551 and 552 the switch automatically switches that signal to the output port 525 for onwards transmission. It can be seen that, in the switch 500, the first and second source beams respectively received from the first and second optical fibers 551 and 552 each serve as both transmission and control beams, with the first and second input ports 521 and 522 respectively serving as first and second control ports.

As for the switches 300 and 400 of FIGS. 3A to 4B2 described above, contention between signals from the first and second optical fibers 551 and 552 can be avoided by network scheduling. Alternatively, the switch 500 can be used to select the stronger of two such signals for onwards transmission, since the light mill will rotate under the control of the more powerful beam.

Figure 6A:
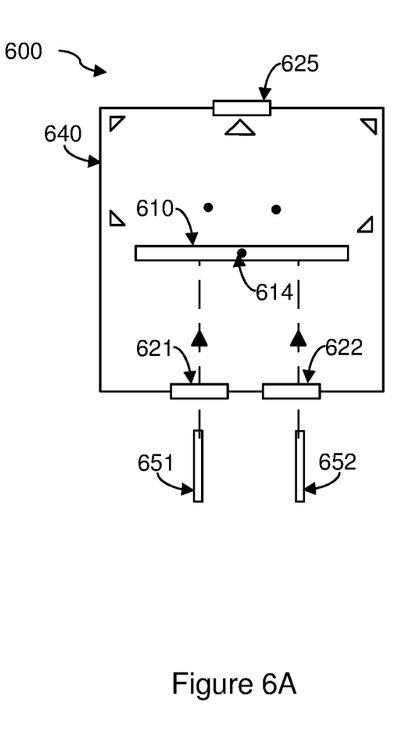
FIG. 6A illustrates another example optical switch in an "off" position.
Figure 6B:
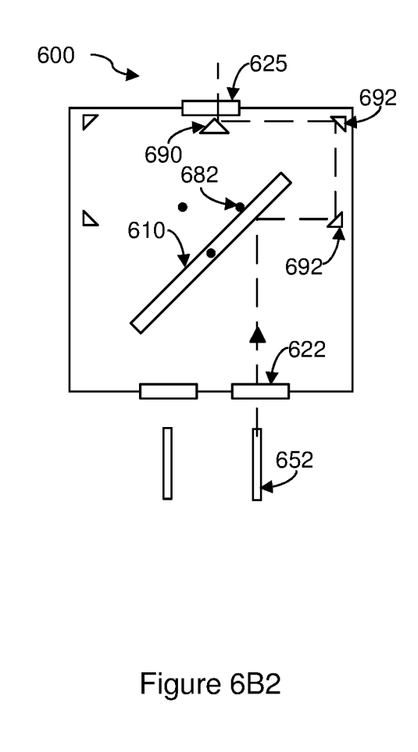
Figure 6B:
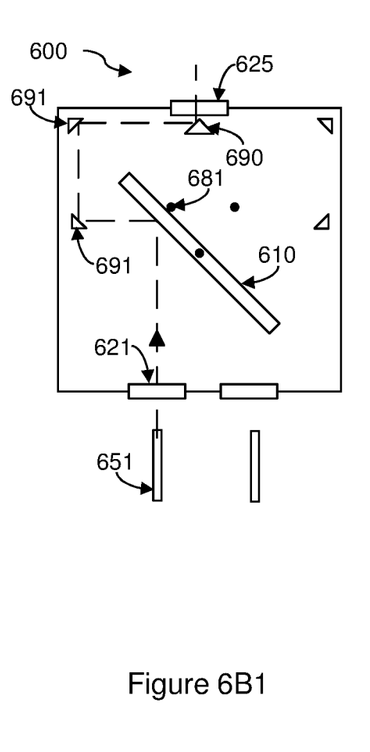

FIG. 6A illustrates a schematic plan view of another example optical switch 600 comprising a light mill in an "off" position. FIGS. 6B1 and 6B2 illustrate schematic plan views of the switch 600 in each of its two possible "on" positions.

The switch 600 is similar to the switch 500 of FIGS. 5A, 5B1 and 5B2 in many respects. The switch 600 can receive inputs from first and second optical fibers 651 and 652. It comprises a housing 640 having first and second input/control ports 621 and 622 respectively coupled to the first and second optical fibers 651 and 652. The switch 600 comprises a light mill having a single vane 610 configured to rotate about a central axis 614 up to positions defined by first and second stays 681 and 682. All of these components are arranged as described above for the corresponding components of the switch 500 of FIGS. 5A, 5B1 and 5B2.

However, unlike the switch 500 of FIGS. 5A, 5B1 and 5B2, the switch 600 does not change the direction of signals transmitted through it, since its single output port 625 is parallel to its two input ports 621 and 622, rather than perpendicular to them. With the light mill in the off position as shown in FIG. 6A, the switch 600 has mirror symmetry in a plane through the center of its output port 625 and its light mill axel 614.

In the switch 600, the paths of first and second source/transmission/control beams respectively from first and second optical fibers 651 and 652 to the vane 610, and the vane's motion in response thereto, proceeds in exactly the same way as described above for the switch 500 of FIGS. 5A, 5B1 and 5B2.

As shown in FIG. 6B1, the portion of the first beam reflected by the vane 610 is reflected around the vane 610 by two light routers 691, via a dual light router 690, to the output port 625. Similarly, as shown in FIG. 6B2, the portion of the second beam reflected by the vane 610 is reflected around the vane 610 by two further light routers 692, via the dual light router 690, to the output port 625. The light routers 691 and further light routers 692 can for example be mirrors, or prisms configured to act as mirrors. The dual light router 690 can for example be a prism, or two mirrors arrange at a right angle to one another.

In this way, when an optical transmission signal is input to the switch 600 via one of the first and second optical fibers 651 and 652 the switch automatically switches that signal to the output port 625 for onwards transmission. It can be seen that, just like in the switch 500 for FIGS. 5A, 5B1 and 5B2, in the switch 600 of FIGS. 6A, 6B1 and 6B2 the first and second source beams respectively received from the first and second optical fibers 651 and 652 each serve as both transmission and control beams, with the first and second input ports 621 and 622 respectively serving as first and second control ports.

As for the switches 300, 400 and 500 of FIGS. 3A to 5B2 described above, contention between signals from the first and second optical fibers 651 and 652 can be avoided by network scheduling. Alternatively, the switch 600 can be used to select the stronger of two such signals for onwards transmission, since the light mill will rotate under the control of the more powerful beam.

FIGS. 7A to 7D illustrate schematic plan views of another example optical switch, respectively in each of its four possible "on" positions.

The switch 700 operates in a similar way to the switch 400 of FIGS. 4A, 4B1 and 4B2, but with inputs from four optical fibers 751, 752, 753 and 754 instead of two. This is achieved by using three light mills, with left-hand and right-hand light mills feeding a central light mill which directs transmission signals from any of the four fibers 751 to 754 to a single output port 725. The right-hand light mill and its associated input and control apparatus are arranged in a very similar way to the light mill of the switch 400. The left-hand light mill and its associated input and control apparatus are arranged in a mirror image fashion. It can be seen from the switch 700 how the design of the switch 400 can be extended to provide switching between larger numbers of inputs.

Figure 7A:
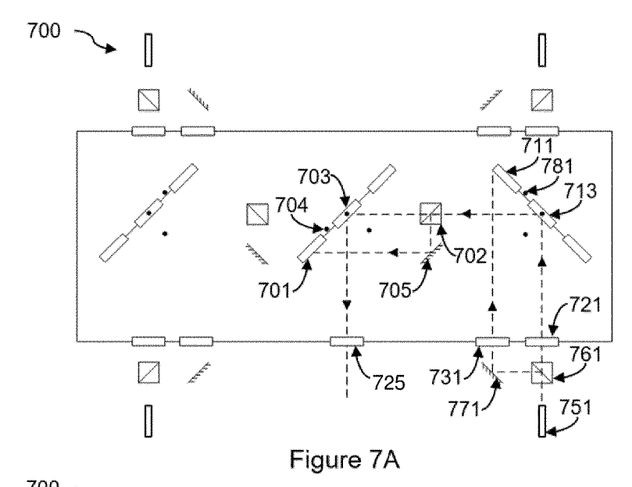
FIG. 7A illustrates another example optical switch in a first "on" position.

As shown in FIG. 7A, a first source beam input by a first optical fiber 751 is incident on a first splitter 761. This splits the first source beam into a first transmission beam and a first control beam. The first transmission beam continues on through a first input port 721, on the same side of the switch 700 as the first optical fiber 751, to be incident centrally on a light director 713 of the right-hand light mill. The first control beam is routed via a first mirror 771, through a first optical control port 731, on the same side of the switch 700 as the first optical fiber 751, to be incident on the side of a first vane 711 of the right-hand light mill closest to the first optical fiber 751.

Figure 7B:
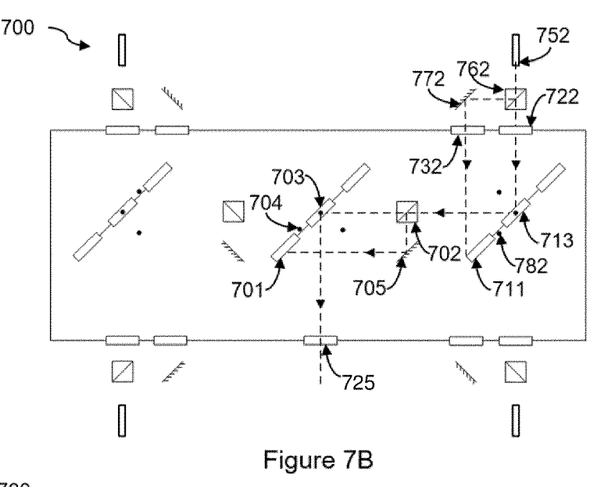
FIG. 7B illustrates the switch of FIG. 7A in a second "on" position.

As shown in FIG. 7B, a second source beam input by a second optical fiber 752 is incident on a second splitter 762. This splits the second source beam into a second transmission beam and a second control beam. The second transmission beam continues on through a second input port 722, on the same side of the switch 700 as the second optical fiber 752, to be incident centrally on the light director 713 of the right-hand light mill. The second transmission beam is incident on the opposite side of the light director 713 of the right-hand light mill to the first transmission beam. The second control beam is routed via a second mirror 772, through a second optical control port 732 on the same side of the switch 700 as the second optical fiber 752, to be incident on the side of the first vane 711 of the right-hand light mill closest to the second optical fiber 752, i.e. the opposite face of the first vane 711 of the right-hand light mill to the face on which the first control beam is incident in FIG. 7A.

The two surfaces of the first vane 711 of the right-hand light mill struck by the first and second control beams respectively are configured to absorb at least some of the electromagnetic radiation carried by those respective beams. These surfaces are thermally insulated from one another so that a temperature gradient arises from the shaded side to the illuminated side. The light mill effect thus causes the right-hand light mill to rotate so that the illuminated vane retreats from the first or second control beam incident on it, as the case may be, or from the more powerful of the two, if both are present. Rotation of the right-hand light mill is halted by respective first and second stays 781 and 782 so that the right-hand light mill is positioned as respectively shown in FIGS. 7A and 7B, respectively 45° clockwise and anticlockwise of its off position (not shown—in its off position the right-hand light mill would extend from left to right on the figures).

The surfaces of the light director 713 of the right-hand light mill on which the first and second transmission beams are incident are both at least partially reflective. The first and second transmission beams are therefore both directed to a right-hand splitter 702 by the light director 713 of the right-and light mill as respectively shown in FIGS. 7A and 7B. This splits the respective one of the first and second transmission beams into a right-hand transmission beam and a right-hand control beam. The right-hand transmission beam is incident centrally on the right-hand side of a light director 703 of the central light mill. The right-hand control beam is routed via a right-hand mirror 705 to be incident on the right-hand side of a first vane 701 of the central light mill.

Figure 7C:
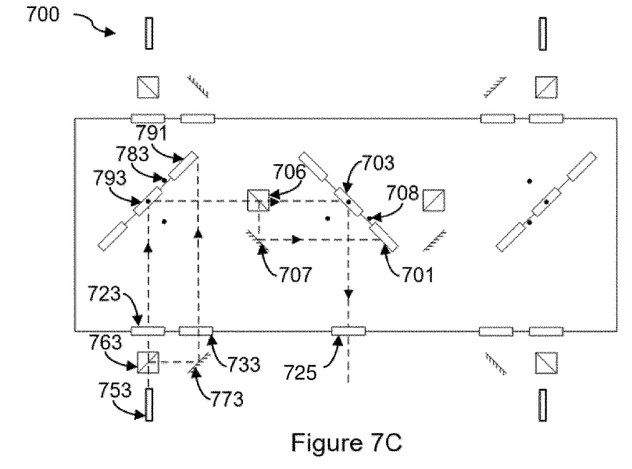
FIG. 7C illustrates the switch of FIG. 7A in a third "on" position.

As shown in FIG. 7C, a third source beam input by a third optical fiber 753 is incident on a third splitter 763. This splits the third source beam into a third transmission beam and a third control beam. The third transmission beam continues on through a third input port 723, on the same side of the switch 700 as the third optical fiber 753, to be incident centrally on a light director 793 of the left-hand light mill. The third control beam is routed via a third mirror 773, through a third optical control port 733, on the same side of the switch 700 as the third optical fiber 753, to be incident on the side of a first vane 791 of the left-hand light mill closest to the third optical fiber 753.

Figure 7D:
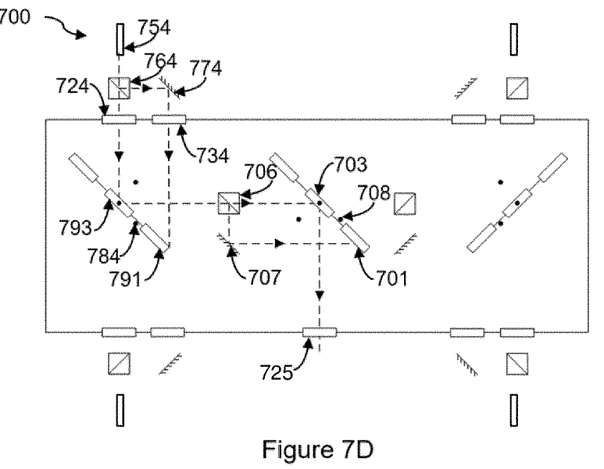
FIG. 7D illustrates the switch of FIG. 7A in a fourth "on" position.

As shown in FIG. 7D, a fourth source beam input by a fourth optical fiber 754 is incident on a fourth splitter 764. This splits the fourth source beam into a fourth transmission beam and a fourth control beam. The fourth transmission beam continues on through a fourth input port 724, on the same side of the switch 700 as the fourth optical fiber 754, to be incident centrally on the light director 793 of the left-hand light mill. The fourth transmission beam is incident on the opposite side of the light director 793 of the left-hand light mill to the third transmission beam. The fourth control beam is routed via a fourth mirror 774, through a fourth optical control port 734 on the same side of the switch 700 as the fourth optical fiber 754, to be incident on the side of the first vane 791 of the left-hand light mill closest to the fourth optical fiber 754, i.e. the opposite face of the first vane 791 of the left-hand light mill to the face on which the third control beam is incident in FIG. 7C.

The two surfaces of the first vane 791 of the left-hand light mill struck by the third and fourth control beams respectively are configured to absorb at least some of the electromagnetic radiation carried by those respective beams. These surfaces are thermally insulated from one another so that a temperature gradient arises from the shaded side to the illuminated side. The light mill effect thus causes the left-hand light mill to rotate so that the illuminated vane retreats from the third or fourth control beam incident on it, as the case may be, or from the more powerful of the two, if both are present. Rotation of the left-hand light mill is halted by respective third and fourth stays 783 and 784 so that the left-hand light mill is positioned as respectively shown in FIGS. 7C and 7D, respectively 45° anticlockwise and clockwise of its off position (not shown—in its off position the left-hand light mill would extend from left to right on the figures).

The surfaces of the light director 793 of the left-hand light mill on which the third and fourth transmission beams are incident are both at least partially reflective. The third and fourth transmission beams are therefore both directed to a left-hand splitter 706 by the light director 793 of the left-hand light mill as respectively shown in FIGS. 7C and 7D. This splits the respective one of the third and fourth transmission beams into a left-hand transmission beam and a left-hand control beam. The left-hand transmission beam is incident centrally on the left-hand side of the light director 703 of the central light mill. The left-hand control beam is routed via a left-hand mirror 707 to be incident on the left-hand side of the first vane 701 of the central light mill.

The two surfaces of the first vane 701 of the central light mill struck by the right-hand and left-hand control beams respectively are configured to absorb at least some of the electromagnetic radiation carried by those respective beams. These surfaces are thermally insulated from one another so that a temperature gradient arises from the shaded side to the illuminated side. The light mill effect thus causes the central light mill to rotate so that the illuminated vane 701 retreats from the right-hand or left-hand control beam incident on it, as the case may be, or from the more powerful of the two, if both are present. Rotation of the central light mill is halted by respective left-hand and right-hand stays 704, 708 so that the central light mill is positioned as respectively shown in FIGS. 7A and 7B versus FIGS. 7C and 7D, respectively 45° clockwise and anticlockwise of its off position (not shown— in its off position the central light mill would extend from top to bottom on the figures).

The surfaces of the light director 703 of the central light mill on which the right-hand and left-hand transmission beams are incident are both at least partially reflective. The right-hand and left-hand transmission beams are therefore both directed to the output port 725, which is parallel to all of the input ports 721 to 724, by the light director 703 of the central light mill as respectively shown in FIGS. 7A and 7B versus FIGS. 7C and 7D.

In this way, when an optical transmission signal is input to the switch 700 via one of the first to fourth optical fibers 751 to 754 the switch automatically switches that signal to the output port 725 for onwards transmission.

Contention between signals from the first to fourth optical fibers 751 to 754 can be avoided by network scheduling. Alternatively, the switch 700 can be used to select the strongest of any such signals for onwards transmission, since the central light mill will rotate under the control of the most powerful beam.

Figure 8A:
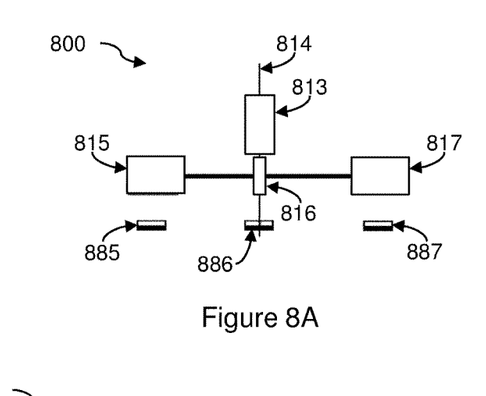
FIG. 8A illustrates some components of another example optical switch.

FIG. 8A illustrates some components of another example optical switch 800 in a side-on view. A different group of components of the switch 800 are illustrated by schematic plan views of it in each of its three possible "on" positions in FIGS. 8B1, 8B2 and 8B3. The optical switch 800, rather than automatically selecting one of multiple inputs to be output like the optical switches 300, 400, 500, 600 and 700 described above in relation to FIGS. 3A to 7D, directs a single input to one of three possible outputs, according to a dedicated control signal.

Figure 8B:
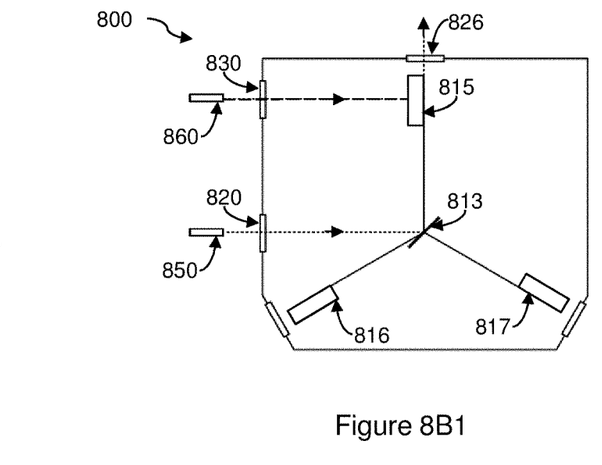
Figure 8B:
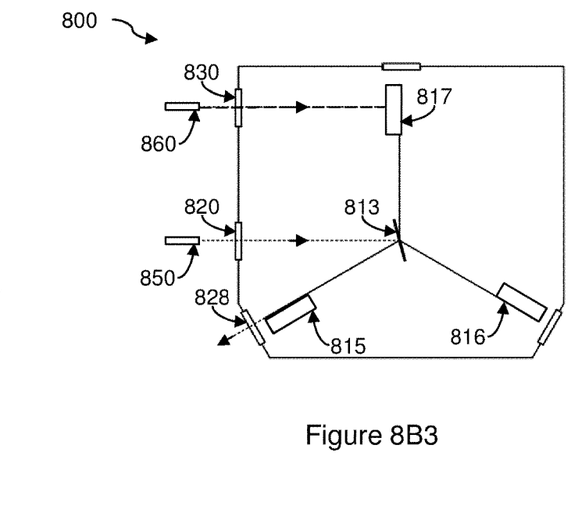

As shown in FIG. 8A, the light mill of the optical switch 800 comprises first to third vanes 815, 816 and 817, configured to rotate about a central axle 814. A light director 813 is positioned on the axle, above the level at which the first to third vanes 815 to 817 are attached. Three possible rotational positions of the light mill (as illustrated in FIGS. 8B1 to 8B3) are set by three magnets 885, 886 and 887 which are arranged below the light mill. The first to third vanes 815 to 817 and/or the spokes to which they are fixed are magnetically attracted to the three magnets 885 to 887.

Figure 8B:
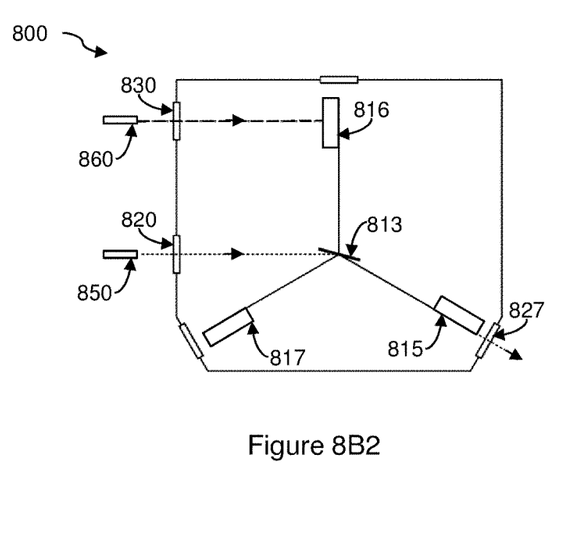

As shown in FIGS. 8B1 to 8B3, a control laser 860 is configured to illuminate the near side of whichever of the first to third vanes 815 to 817 is in the position closest to it by illuminating an optical control port 830. The control signal is carried by a control beam (indicated by a dashed line). All of the first to third vanes 815 to 817, the control laser 860 and the control port 830 are located at the same height. Each of the first to third vanes 815 to 817 has a face arranged to be illuminated by the control laser 860 (when the light mill is in the appropriate rotational position) and an opposing face thermally insulated from it. The light mill therefore rotates clockwise when the control laser 860 is switched on. The control laser 860 can be switched on for a brief interval to cause the light mill to rotate clockwise to its next position (e.g. from the position shown in FIG. 8B1 to the position shown in FIG. 8B2), or for twice that brief interval to cause the light mill to rotate clockwise to its one other possible position (e.g. from the position shown in FIG. 8B1 to the position shown in FIG. 8B3). The duration of the interval can be established by a calibration method.

In an alternative design, the magnets 885 to 887 could be omitted, provided the control laser timing is strictly controlled to ensure that the light mill rotates precisely to the correct positions without falling short or overshooting and the switch is isolated from vibrations which could misalign the light mill.

An optical fiber 850 is arranged to illuminate an optical input port 820 with a transmission beam (indicated by a dotted line). The transmission beam continues on to be incident on the light director 813. All of the optical fiber 850, the input port 820 and the light director 813 are located at the same height. The light director 813 is configured to rotate together with the first to third vanes 815 to 817 and is at least partially reflective on both sides. It is arranged so as to direct the transmission beam to one of three optical output ports 826, 827 or 828 depending on the rotational position of the light mill. In FIG. 8B1, with the first vane 815 in the position closest to the control port 830, the transmission beam is directed to a first output port 826. In FIG. 8B2, with the light mill rotated 120° clockwise with respect to its position in FIG. 8B1 so that the second vane 816 in the position closest to the control port 830, the transmission beam is directed to a second output port 827. In FIG. 8B3, with the light mill rotated 120° clockwise with respect to its position in FIG. 8B2 so that the third vane 817 in the position closest to the control port 830, the transmission beam is directed to a third output port 828.

In this way, an optical transmission signal input from the optical fiber 850 can be directed to any of the first to third output ports 826 to 828 by switching on the control laser 860 for an appropriate interval. This can for example be done according to a computer-implemented scheduling method.

The switch design shown in FIGS. 8A, 8B1, 8B2 and 8B3 could also be used in reverse to provide an alternative multiple-input/single-output switch. In that case the ports 826, 827 and 828 would be input ports and the port 820 would be the common output port.

The design of the switch 800 could also be adapted to switch an input to one of any number of outputs (or any number of inputs to a single output, if reversed as suggested in the preceding paragraph) by changing the number of vanes 815 to 817 and corresponding number of ports 826 to 828 capable of respective alignment with them.

Figure 9A:
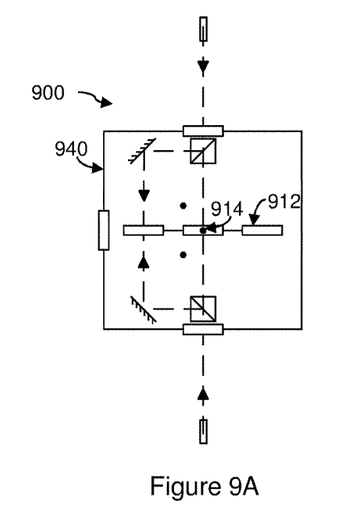
FIG. 9A illustrates another example optical switch in an "off" position.
Figure 9B:
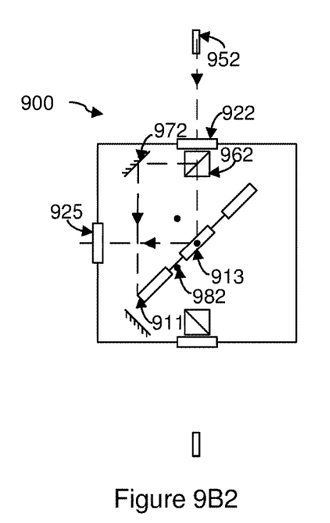
Figure 9B:
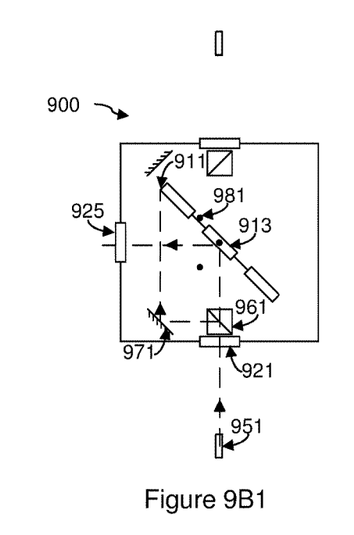

FIG. 9A illustrates a schematic plan view of another example optical switch 900 comprising a light mill in an "off" position. FIGS. 9B1 and 9B2 illustrate schematic plan views of the switch 900 in each of its two possible "on" positions.

Examples of suitable materials and dimensions of the various components of the switch 900 are provided below. Similar materials and dimensions could be used for the corresponding components of any of switches 300 to 800 of FIGS. 3A to 8B3 described above.

The switch 900 is similar to the switch 400 of FIGS. 4A, 4B1 and 4B2 in many respects. The switch 900 can receive inputs from first and second optical fibers 951 and 952. These can for example be optical communication fibers carrying laser light in the c-band (1530 to 1565 nm) wavelength range. It comprises a sealed housing 940 and an output port 925. The switch 900 comprises a light mill comprising a first vane 911, configured to be capable of absorbing a control signal on both sides, a second vane 912 acting as a counterweight to the first vane 911 and a light director 913 intermediate the first and second vanes 911 and 912 and configured to be reflective on both sides. The first and second vanes 911 and 912 and the light director 913 are all configured to rotate around an axle 914. With the light mill in the off position as shown in FIG. 9A, the switch 900 has mirror symmetry in a plane through the center of its output port 925 and its light mill axel 914. All of these components are arranged as described above for the corresponding components of the switch 400 of FIGS. 4A, 4B1 and 4B2.

However, unlike in the switch 400 of FIGS. 4A, 4B1 and 4B2, there are no separate input and control ports in the housing 940. (Reducing the number of ports in the housing 940 makes it easier to maintain a suitable pressure within it for operation of the light mill.) Instead, first and second transmission ports 921 and 922 respectively receive first and second source beams from the first and second optical fibers 951 and 952. The first and second source beams then go on to respectively be incident on first and second splitters 961 and 962, within the housing 940. These split the first and second beams into respective first and second transmission and control beams. The first and second transmission beams continue on to be incident centrally on the light director 913. The first and second control beams are routed via respective first and second mirrors 971 and 972, within the housing 940, to be incident on the respective near side of the first vane 911.

The two surfaces of the first vane 911 struck by the first and second control beams respectively are configured to absorb at least some of the electromagnetic radiation carried by those respective beams. These surfaces are thermally insulated from one another so that a temperature gradient arises from the shaded side to the illuminated side. Thermal insulation between these two surfaces can for example be provided by one or more layers of ceramic, acrylonitrile butadiene styrene (ABS) plastic, glass or graphite. The light mill effect thus causes the light mill to rotate so that the illuminated vane retreats from the control beam incident on it. Rotation of the light mill is halted by respective first and second stays 981, 982 so that the light mill is positioned as respectively shown in FIGS. 9B1 and 9B2, respectively 45° clockwise and anticlockwise of its off position as shown in FIG. 9A.

The surfaces of the light director 913 on which the first and second transmission beams are incident are both at least partially reflective. The first and second transmission beams are therefore both directed to the output port 925, which is perpendicular to both of the transmission ports 921 and 922, by the light director 913 as respectively shown in FIGS. 9B1 and 9B2.

In this way, when an optical transmission signal is input to the switch 900 via one of the first and second optical fibers 951 and 952 the switch automatically switches that signal to the output port 925 for onwards transmission.

Contention between signals from the first and second optical fibers 951 and 952 can be avoided by network scheduling. Alternatively, the switch 900 can be used to select the stronger of two such signals for onwards transmission, since the light mill will rotate under the control of the more powerful beam.

Figure 9C:
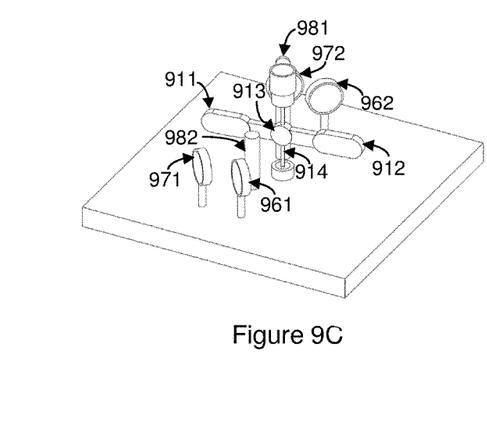
FIG. 9C illustrates some internal components of the switch of FIG. 9A.

FIG. 9C illustrates the components within the housing 940 of the switch 900 of FIGS. 9A, 9B1 and 9B2 three dimensionally. The second stay 982 can be seen as a post in the foreground. The first stay 981 is located behind the axle 914 in the view of FIG. 9C. The first stay 981 forms a support for the top end of the axle 914 so that the light mill can rotate freely between this support and the switch 900's base. The vanes 911 and 912 can for example be approximately 1 mm thick and 4 mm long. The spokes carrying the vanes 911 and 912 can for example be approximately 10 mm long from the axel to the end of the vane. The light director 913 can for example be a two-sided mirror made of glass coated on both faces with a reflective metal such as aluminum, silver or gold, or a dielectric film.

Figure 9D:
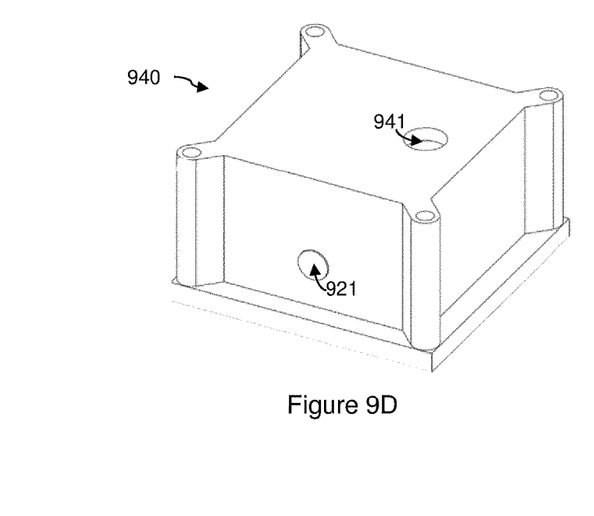
FIG. 9D illustrates a housing of the switch of FIG. 9A.

FIG. 9D illustrates the housing 940 of the switch 900 of FIG. 9A to 9C three dimensionally. The first transmission port 921 is visible in the foreground. An aperture 941 in the top of the housing 940 is also visible. The aperture 941 is configured for attachment of vacuum apparatus so that the air inside the housing 940 can be kept at a suitable low pressure for operation of the light mill, for example between 300 and 600 mTor. The housing 940 can for example be approximately 40 mm square in plan and approximately 25 mm tall. One or more of the transmission ports 921, 922 and 925 can for example be recessed to enable a snug interference fit between the housing 940 and respective optical fibers coupled to each of the transmission ports 921, 922 and 925. (For clarity, this is not illustrated in the schematic views shown in FIGS. 9A, 9B1 and 9B2.) The transmission ports 921, 922 and 925 can thus each be sealed into the internal portion of a stepped profile aperture in the housing 940, for example with an internal diameter of approximately 3 mm and an external diameter of approximately 4.6 mm. The housing 940 can for example be made of plastic, metal, or another impermeable solid. The entire switch assembly 900 can for example have a mass of approximately 15 g.

In all of the example switches described above, at least one region of at least one face of at least one vane of each light mill is configured to have light incident upon it, and to absorb energy from that light so that it heats up relative to an opposing region of an opposing face of that vane. The absorbing region can for example be coated with graphite, black aluminum foil, anodized aluminum or Litho-Black™. Provided the opposing regions are thermally insulated from one another and the absorbing region is illuminated to a greater extent than the opposing region, there is no need for there to be any asymmetry in their optical absorptance. (Optical absorptance is defined as the ratio of absorbed to incident radiant power.) For example, the two sides of the vanes struck by control beams in the example switches 400, 700 and 900 described above are symmetrical. The light mill effect still arises since only one side of the vane is illuminated. (The illuminating light being a laser beam sufficiently narrow with respect to the size of the vane that one side of the vane is targeted enhances the effect.) However, in the other example switches described above the light mill effect can be enhanced by providing the absorbing region with a higher optical absorptance than the opposing region. For example, the opposing region can be covered with a reflective metal such as silver or a dielectric material. Alternatively or additionally, the absorbing region can be shaped such that it receives a greater quantity of radiant flux than the opposing region, making use of the principle described in relation to FIG. 2 above.

Other than the single-input/multiple-output switch 800, in all of the example switches described above the control beam and the transmission beam are derived from a common source beam. Dedicated control beams could however be used in multiple-input/single-output switches too. Where a common source beam is used the switches can be used to automatically select the strongest signal for output from multiple inputs as noted above. This functionality could for example be used to automatically switch in a back-up fiber which carries a lower power version of a signal usually carried by a primary fiber, should that primary fiber fail.

In all of the example switches described above, the light director is arranged to rotate with the light mill. However, other arrangements could be envisaged wherein motion of the light mill causes the light director to redirect the transmission beam in some other way. For example, a cam arrangement could be used to translate the rotational motion of a light mill into linear motion of a light director.

In the example switches 300, 400, 500, 600, 700 and 900 motion of the light mill is constrained by stays in the form of buffer/bumper/rest elements provided for each of the light mill vanes (and/or spokes on which they are carried) to but up against. Alternatively, a single stay could be provided for multiple vanes, e.g. so that in a two-vane example the light mill rotates almost a full circle between its two positions.

Other forms of stay could also be used; any element that prevents or impedes rotation beyond a certain position in one direction, while allowing (some) counter-rotation away from that position, would be suitable. For example other kinds of mechanical stays, such as catches, could be envisaged, in addition to magnetic stays such as those shown in FIG. 8A.

In all of the example switches described above the light director comprises a mirror. Such a mirror can be provided by a surface which is at least partially reflective. Other optical components, such as prisms, could alternatively be used to direct the transmission beam. If the light director needs to be capable of absorbing some light, for example in the example switches 500 and 600 described above, its surface can for example be made partially reflective by layering a thin dielectric over a light absorbent surface (e.g. a surface coated with a light-absorbent material as described above).

In all of the example multi-input/single-output switches described above, except for switches 500 and 600, the light director is arranged to reflect light incident substantially on the light mill's axis of rotation. This results in light being incident on the output port along substantially the same line regardless of the one of the input ports it originated from, so that injection efficiency of coupling to an output optical fiber can be optimized for all inputs, even where the output fiber has only a small acceptance angle.

In the example switch 800, magnets are used to bias the light mill towards positions in which the transmission beam can be routed from an input to an output. Magnets or other forms of biasing elements could be used for this purpose in switches like the switch 800, the other example switches 300 to 700 or 900 described above or any other switch according to the present disclosure. For example a spring or elastic member could be provided which is twisted or compressed by rotation of the light mill (e.g. the axle of the light mill itself could be elastic). Alternatively one or more biasing elements could be used to bias the light mill towards an off position. This can increase the switching speed and/or reduce the energy required from the control beam. Inclusion of a biasing element can reduce the risk of the light mill rotating under any influences except for the light mill effect, for example in response to external vibrations. This is because the biasing element increases the threshold radiant flux required to start the light mill rotating relative to a light mill whose acceleration is only limited by its own inertia. Biasing elements can be adjustable to allow for calibration. For example, the tension of an elastic member could be adjusted by winding or unwinding it from a reel. The strength of a magnetic attraction between a light mill vane and a magnet with respect to which the light mill can rotate could be adjusted by moving that magnet, e.g. by screwing it further in or out of a threaded nut.

The optical transmission (input/output) and control ports used in switches according to the present disclosure can be used to couple light from/to optical fibers. The ports can optionally comprise lenses to focus or defocus that light as appropriate.

Other embodiments will be apparent to those skilled in the art from consideration of the specification and practice of the embodiments disclosed herein. It is intended that the specification and examples be considered as exemplary only.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

The invention claimed is:

1. An optical switch for routing an optical transmission signal according to an optical control signal, the optical switch comprising:
   one or more optical control ports, and three or more optical transmission ports, wherein:
      each optical control port can be an optical transmission port,
      each optical transmission port can be an optical control port, and
      each optical control port and each optical transmission port can be distinct;
   three or more optical transmission ports;
   a light director; and
   a thermally driven light mill;
   wherein the thermally driven light mill and the light director are arranged with respect to each other, to the one or more optical control ports and to the three or more optical transmission ports such that:
      illumination of a respective one of the one or more optical control ports by a control beam carrying the optical control signal drives the thermally driven light mill to rotate towards a respective position in which the light director is arranged so as to direct a transmission beam carrying the optical transmission signal, entering the optical switch via a respective one of the three or more optical transmission ports, to exit the optical switch via a respective other one of the three or more optical transmission ports.

2. The optical switch of claim 1, wherein the control beam originates from a laser.

3. The optical switch of claim 1, wherein at least one of:
   a side of a vane of the thermally driven light mill arranged to be illuminated by the control beam has a higher optical absorptance than an optical absorptance of an opposing side of the vane; or
   a side of a vane of the thermally driven light mill arranged to be illuminated by the control beam and an opposing side of the vane are shaped such that, over a range of rotation of the thermally driven light mill from an initial position in which the thermally driven light mill resides immediately preceding illumination of the respective one of the one or more optical control ports by the optical control signal, to the respective position, the side of the vane illuminated by the control beam receives a greater quantity of radiant energy from the control beam than the opposing side of the vane.

4. The optical switch of claim 1, wherein the three or more optical transmission ports comprise a single optical input port and a plurality of optical output ports, the thermally driven light mill and the light director being arranged with respect to each other, to the one or more optical control ports and to the three or more optical transmission ports such that, for each of the optical output ports:
   illumination of a respective one of the one or more optical control ports by the control beam drives the thermally driven light mill to rotate towards a respective position in which the light director is arranged so as to direct the transmission beam, entering the optical switch via the optical input port, to exit the optical switch via that optical output port.

5. The optical switch of claim 1, wherein the optical transmission ports comprise a plurality of optical input ports and a single optical output port, the thermally driven light mill and the light director being arranged with respect to each other, to the one or more optical control ports and to the three or more optical transmission ports such that, for each of the plurality of optical input ports:
illumination of a respective one of the one or more optical control ports by the control beam drives the thermally driven light mill to rotate towards a respective position in which the light director is arranged so as to direct the transmission beam, entering the switch via that optical input port, to exit the switch via the optical output port.

6. The optical switch of claim 5, configured such that, for each of the optical input ports, the control beam and the transmission beam are derived from a common source beam.

7. The optical switch of claim 6, wherein, for each of the optical input ports, the one of the one or more optical control ports illuminated by the optical control signal is each of the optical input ports, the source beam itself serving as both the transmission beam and the control beam.

8. The optical switch of claim 6, further comprising, for each of the optical input ports, an optical splitter arranged to split the source beam into the transmission beam and the control beam.

9. The optical switch of claim 5, wherein the light director is arranged to rotate with the thermally driven light mill.

10. The optical switch of claim 9, wherein the light director comprises a mirror.

11. The optical switch of claim 10, wherein a surface of the thermally driven light mill on which the optical control signal is incident is partially reflective, thereby providing the mirror.

12. The optical switch of claim 10, wherein the mirror is arranged to reflect light incident substantially on an axis of rotation of the thermally driven light mill such that light is incident on the optical output port along substantially a same line regardless of the one of the optical input ports the light originated from.

13. The optical switch of claim 1, wherein there is only one optical control port, the optical switch further comprising an optical control signal source configured to illuminate the optical control port according to a computer-implemented scheduling method.

14. An optical routing system comprising:
the optical switch of claim 13 and
a computing device arranged to implement the computer-implemented scheduling method.

15. The optical switch of claim 1, further comprising one or more stays each arranged to prevent rotation of the thermally driven light mill beyond at least one of the respective positions.

16. The optical switch of claim 1, further comprising a biasing element, the thermally driven light mill being coupled to the biasing element such that:
the thermally driven light mill is biased towards an equilibrium position different from any of the respective positions, wherein the equilibrium position can be an off position; or
the thermally driven light mill is biased towards one of the respective positions.

17. The optical switch of claim 1, further comprising a housing which encloses the thermally driven light mill, the housing comprising an aperture configured for partial evacuation of fluid surrounding the thermally driven light mill.

18. A method of routing an optical transmission signal, the method comprising illuminating one of the optical transmission ports of the optical switch of claim 1 with the optical transmission signal.

19. The method of claim 18, wherein the optical switch has only one optical control port and further comprises an optical control signal source configured to illuminate the one optical control port according to a computer-implemented scheduling method, the method further comprising:
illuminating the one optical control port for one of d predetermined durations, each of the predetermined durations corresponding to a rotation of the thermally driven light mill from a first one of the respective positions to a respective one of the other such respective positions, wherein d is equal to p−1, p being a number of the optical transmission ports.

* * * * *